United States Patent
Arata (10) Patent No.: US 7,227,558 B1
(45) Date of Patent: Jun. 5, 2007

(54) APPARATUS AND METHOD FOR SORTING LINE BREAK NUMBERS FOR LINE BREAK LOCATIONS WITHIN SERIES OF FIGURES

(75) Inventor: Kazunori Arata, Shimizu (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/499,730

(22) Filed: Feb. 8, 2000

(30) Foreign Application Priority Data

Sep. 24, 1999 (JP) ................................. 11-269890

(51) Int. Cl.
  G09G 5/00 (2006.01)
  G06F 17/50 (2006.01)
  G09B 25/00 (2006.01)
  G09B 29/00 (2006.01)

(52) U.S. Cl. ...................... 345/676; 434/406; 434/428; 434/430; 715/517; 345/677; 716/11

(58) Field of Classification Search ................ 345/619, 345/676–677; 715/517; 716/11; 434/406, 434/428, 430
See application file for complete search history.

(56) References Cited

U.S. PATENT DOCUMENTS 5,557,727 A * 9/1996 Nagai .......................... 345/440
5,568,397 A * 10/1996 Yamashita et al. ............. 716/11
6,232,983 B1 * 5/2001 Felser et al. ................. 345/649
6,232,985 B1 * 5/2001 Chase et al. ................. 345/441
6,337,748 B1 * 1/2002 Murata et al. ............... 358/1.4

OTHER PUBLICATIONS

Plume, J. "Introduction to AutoCAD". Jun. 25, 1999.*
Pong, T.S. "Extraction and Compression of Interconnect Parasitics for Small-Feature Analog IC Layouts". Sep. 1993.*
Microsoft® Word 2000.*

* cited by examiner

*Primary Examiner*—Ulka Chauhan
*Assistant Examiner*—Jeffrey J Chow
(74) *Attorney, Agent, or Firm*—Staas & Halsey LLP (57) ABSTRACT

The object of the present invention is to assign line break numbers to locations where line breaks have been made in order to separate a series of figures configured by connecting a number of figures into parts in a manner which makes it easy for a user to view a drawing including the series of figures, or a series of figures. In response to a line break operation for separating a series of figures configured by connecting a plurality of figures into parts, line break numbers displayed at line break locations are sorted based on a positional relationship of the line break locations. The series of figures with the sorted line break numbers assigned to the line break locations is displayed after performing the line break operation. The line numbers are therefore assigned in a consecutive manner for each series of figures. If there are a plurality of series of figures within a drawing, the line break numbers are assigned to the series of figures using a predetermined rule so that the drawing as a whole becomes easier to see.

16 Claims, 8 Drawing Sheets

| CIRCUIT START POINT FIGURE ID | NUMBER OF LINE BREAK LOCATIONS | CIRCUIT START POINT NUMBER |
|---|---|---|
| L | 1 | 1 |
| M | 3 | 2 |
| N | 1 | 4 |

FIG.8

| CIRCUIT START POINT FIGURE ID | NUMBER OF LINE BREAK LOCATIONS | CIRCUIT START POINT NUMBER |
|---|---|---|
| L | 1 | 1 |
| M | 3 | 2 |
| N | 1 | 5 |

| CIRCUIT START POINT FIGURE ID | NUMBER OF LINE BREAK LOCATIONS | CIRCUIT START POINT NUMBER |
|---|---|---|
| L | 2 | 1 |
| M | 3 | 2 |
| N | 1 | 5 |

FIG.13

| CIRCUIT START POINT FIGURE ID | NUMBER OF LINE BREAK LOCATIONS | CIRCUIT START POINT NUMBER |
|---|---|---|
| L | 2 | 1 |
| M | 3 | 3 |
| N | 1 | 6 |

| CIRCUIT START POINT FIGURE ID | NUMBER OF LINE BREAK LOCATIONS | CIRCUIT START POINT NUMBER |
|---|---|---|
| L | 1 | 1 |
| M | 3 | 2 |
| N | 1 | 4 |

FIG.18

| CIRCUIT START POINT FIGURE ID | NUMBER OF LINE BREAK LOCATIONS | CIRCUIT START POINT NUMBER |
|---|---|---|
| L | 1 | 1 |
| M | 3 | 2 |
| N | 1 | 5 |

PRIOR ART

APPARATUS AND METHOD FOR SORTING LINE BREAK NUMBERS FOR LINE BREAK LOCATIONS WITHIN SERIES OF FIGURES

FIELD OF THE INVENTION

The present invention relates to figure displaying technology, more particularly to technology for displaying line break numbers assigned to line break locations resulting from line break operations performed in order to separate a long figure, such as a circuit drawing, into parts for its display, etc.

BACKGROUND OF THE INVENTION

Figure 22:
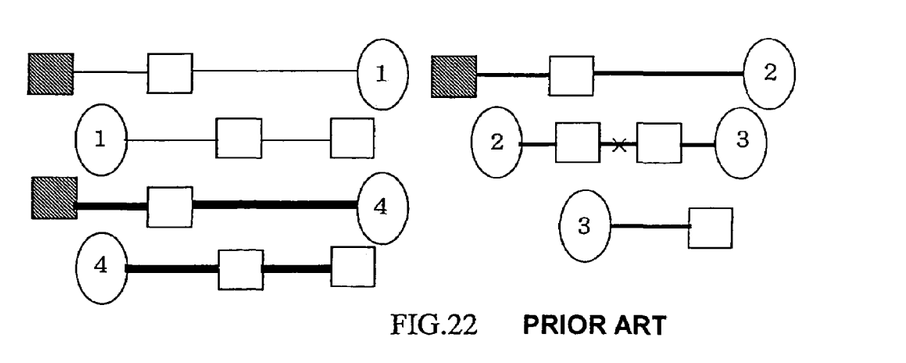
FIG. 22 shows an example display illustrating related technology.

If a series of figures configured by connecting a plurality of figures is depicted in a drawing, such as, for example, in the case of a circuit diagram or system diagram, a method is employed for representing the connections of the figures by changing a line, by depicting so as to separate the series of figures into parts, and by attaching symbols with the same numbers to the separating location. This is because the series of figures cannot be depicted or displayed on a single line. An example of this method is shown in FIG. 22. Three circuits are shown in FIG. 22, with each circuit being differentiated by the thickness of lines connecting rectangles representing equipment included in the circuits. Rectangles filled in with diagonal lines means the beginning of each circuit. In the following, the beginning of each circuit is referred to as the circuit start point. The line break symbols are shown as being longitudinal ellipses containing numbers (hereinafter referred to as line break numbers) for the line break locations at which line breaks take place. The upper left circuit is a circuit of two lines linked by line break symbols of line break number 1. The right side circuit is a circuit of three lines linked by line break symbols of line break number 2 and line break symbols of line break number 3. The lower left circuit is a circuit of two lines linked by line break symbols of line break number 4.

Figure 23:
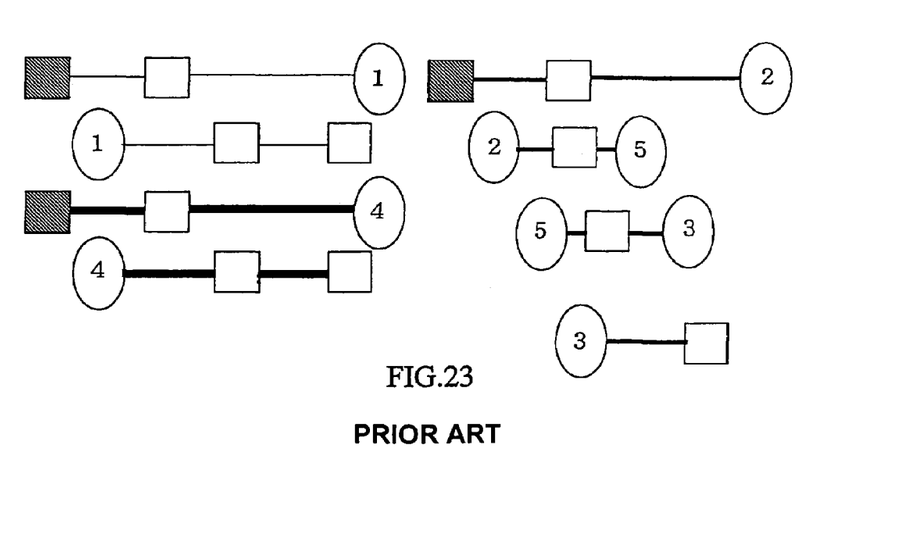
FIG. 23 shows a further example display illustrating related technology.

A number of circuits are depicted within a single drawing as shown in FIG. 22, and a figure is moved after a line break, in addition, after the first line break, the second line break is performed before the location where the first line break occurs (a so-called insertion line break). Conventionally, line break numbers are given in the order in which the line breaks are made, which makes the connection of the figures difficult to see. For example, if a new line break operation is at the point shown by x in the second line of the circuit on the right side in FIG. 22, then in the related technology the drawing becomes as shown in FIG. 23, i.e. the line break number 5, which is the next number of the highest line break number 4 used in FIG. 22, is given to the location where the line break occurs. The circuit on the right of FIG. 23 is therefore given line break numbers in a discontinuous manner, i.e. line break numbers 2, 3, and 5. It is still possible to identify the manner in which the circuit in FIG. 23 is connected because this is a simple example but there is the fear that the connection of the circuit will no longer be easily identifiable if parts of the circuit are moved hereafter.

SUMMARY OF THE INVENTION

It is therefore the object of the present invention to provide a figure display apparatus and method and a figure display program capable of giving line break numbers to locations where line breaks have been made in order to separate a series of figures configured by connecting a number of figures into parts in a manner which makes it easy for a user to view a drawing including the series of figures, or a series of figures itself.

A figure displaying apparatus for displaying figures, which is a first aspect of the present invention, comprises a sorter for sorting line break numbers displayed at line break locations based on a positional relationship of the line break locations in response to a line break operation for separating a series of figures configured by connecting a plurality of figures into parts. The figure displaying apparatus then displays the series of figures with the sorted line break numbers assigned to the line break locations after the line break has been performed. If sorting based on the positional relationship of line break locations within the series of figures is performed, the line break numbers within the series of figures are assigned in order and the connections between figures within the series of figures can therefore be more easily understood. Further, if sorting is based on the positional relationship of line break locations occurring within the series of figures taking into consideration the positional relationship of the series of figures including the line break locations, the line break numbers are assigned in order both for the entire drawing and within the series of figures. The figures are therefore more easily understood both collectively and with regards to connections between the figures.

The sorter may be configured so as to sort the line break numbers based on the positional relationship of the line break locations without destroying the alignment of figures within the series of figures if a part of the separated series of figures is moved after the line break operation and another line break operation are performed again.

The sorter may be configured so as to perform sorting by assigning line break numbers in order to each line break location without destroying the alignment of figures within the series of figures if there is one series of figures, or if there is one series of figures having line break locations.

A configuration is also possible for the aforementioned sorter where, if a plurality of series of figures exist or if a plurality of series of figures having line break locations exist, in response to the line break operation, the sorter sorts the line break numbers displayed at line break locations based on the positional relationship of the series of figures and the positional relationship of line break locations occurring within the series of figures in such a manner that the line break numbers are successive between the series of figures and within each series of figures.

If a plurality of series of figures exist or if a plurality of series of figures having line break location exist, it is also possible to configure the aforementioned sorter so as to sort the plurality of series of figures in accordance with a predetermined rule, determine a start number of a line break number within each of the series of figures including the line break locations based on the sorting result and the number of line break locations included in the series of figures, and determine a line break number for each line break location based on the start number and the positional relationship of line break locations occurring within the series of figures.

It is possible that the aforementioned processing of determining the start numbers and determining the number for each line break location is just performed for a series of figures that are influenced by the line break operation.

The positional relationship of the line break locations within the series of figures may include the order of line break locations from the beginning of the series of figures counted in a manner that does not destroy alignment of the figures within the series of figures.

The plurality of series of figures may include a series of figures extending in a horizontal direction and a series of figures extending in a vertical direction. Line break numbers may also be assigned taking into consideration the direction of the series of figures.

Sorting of the plurality of series of figures in accordance with the predetermined rule may also be carried out based on the position of a reference figure within each of the plurality of series of figures.

A figure displaying method for displaying figures, which is a second aspect of the present invention, comprises the steps of: in response to a line break operation for separating a series of figures configured by connecting a plurality of figures into parts, sorting line break numbers displayed at line break locations based on a positional relationship of the line break locations, and displaying the series of figures with the sorted line break numbers assigned to the line break locations.

This method may also be provided as a program executed by a computer. This program may be stored on, for example, a storage medium or storage device such as a floppy disk, CD-ROM, magneto-optical disk, semiconductor memory or hard disk etc.

DETAILED DESCRIPTION OF THE PREFERRED EMBODIMENTS

Figure 1:
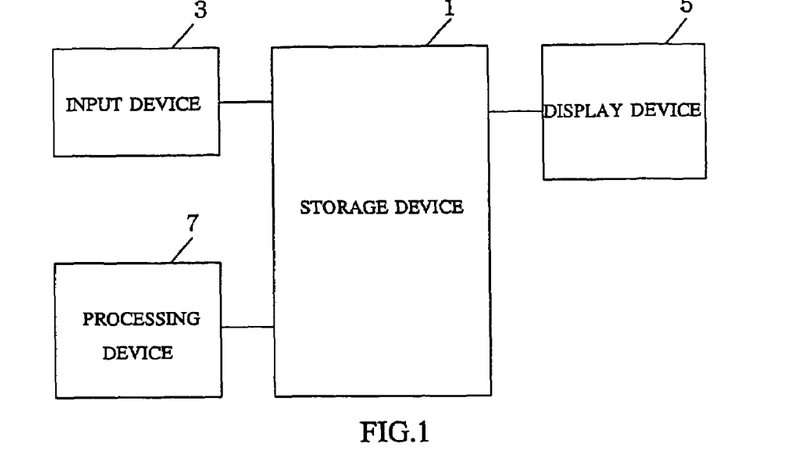
FIG. 1 is a block diagram of an outline of an apparatus of the present invention.

FIG. 1 shows the configuration of an apparatus of the present invention. Here, a processing device 1 is connected to an input device 3, display device 7 and storage device 5. The processing device 1 performs conversational processing with the user based on input from the input device 3 operated by the user and displays the results of the processing at the display device 7. The processing device 1 carries out processing necessary in the control of all other devices and executes the processing described in the following for the present invention. The storage device 5 stores programs implementing the present invention and necessary data as well as storing other required programs and data. Intermediate data generated during execution of processing of the present invention is stored in memory (not shown) included in the processing device 1.

In the present invention, a figure identifier, a figure position, information relating to the shape of the figure (when, for example, the figure is a circle, information indicating the presence of a circle together with the central coordinate and radius of the circle), indication whether or not the figure is a circuit start point, and a connectional relationship (figure identifiers connected to this figure), is stored in, for example, the storage device 5 for each figure. In the case of a figure which is a circuit start point, a circuit start point number and the number of line break locations described hereafter are stored in, for example, the storage device 5, and in the case of a line break symbol, a circuit start point number and displacement described hereafter are stored in, for example, the storage device 5.

To make the present invention easy to understand, an example display for if the present invention is performed is shown. Basically, an original circuit is connected at locations having line break symbols given the same numbers. The numbers given in this example are consecutive for each circuit. Further, if a plurality of circuits exist, the first line break number is given to each circuit in this example in an order where the position of the circuit start point is in the upper left, upper right, lower left and lower right of the drawing.

Figure 2:
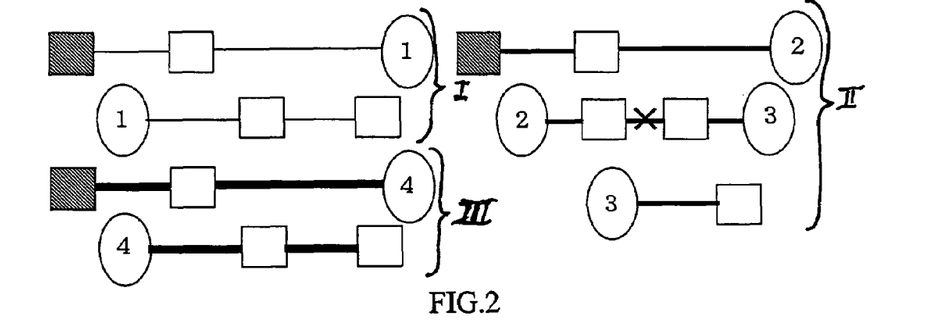
FIG. 2 is a view showing an example of a drawing with three circuits.

If certain line break operation is carried out, the line break numbers are sorted so as to fulfill this condition. FIG. 2 is an example display for after a line break is made at one of the line break locations in the drawing. In FIG. 2, three circuits I, II and III are shown, distinguished by the respective, mutually different thicknesses of lines linking the equipment, the original series of figures of circuit I having been connected at the locations of the common line break numbers 1, those of circuit II at the locations of the common line break numbers 2 and the common line break numbers 3, and those of circuit III at the locations of the common line break numbers 4. Figures filled in with diagonal lines are provided for the figures for the circuit start points. FIG. 2 is substantially the same as the related art shown in FIG. 22 but differs in the respect that in FIG. 22 the line break operations must be executed in the order of the line break numbers which are displayed in FIG. 22. However, in the case of the present invention in FIG. 2, the display becomes as shown in FIG. 2, no matter in what order the line break operations are executed in FIG. 2 if the line break locations are the same and each circuit is positioned in the same manner.

Figure 3:
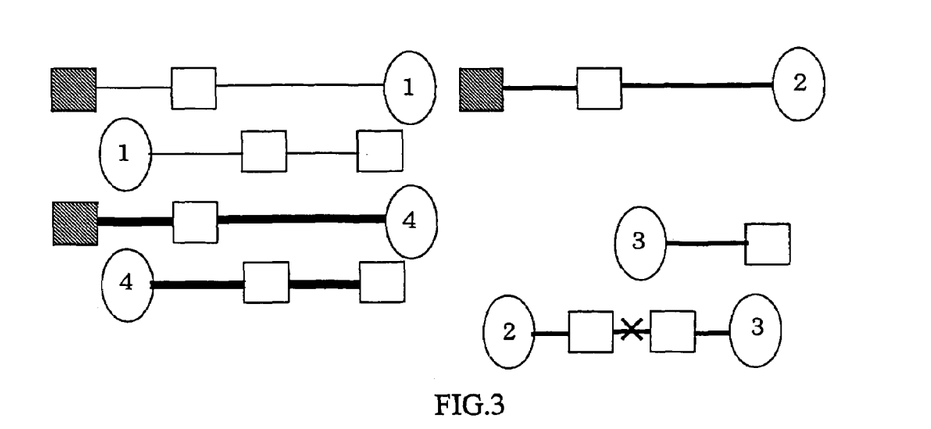
FIG. 3 is a view showing the case of moving a line assigned with the mark x in FIG. 2.

Next, an example of movement of the figures from line break number 2 to line break number 3 of FIG. 2 is shown in FIG. 3. In FIG. 3 the line break number is not changed. If the line break numbers are changed as a result of this movement, the alignment of the equipment (figures) in the circuit is deteriorated and the meaning of the entire circuit is changed. The characteristic feature of the present invention is therefore not shown by the operation from FIG. 2 to FIG. 3.

Figure 4:
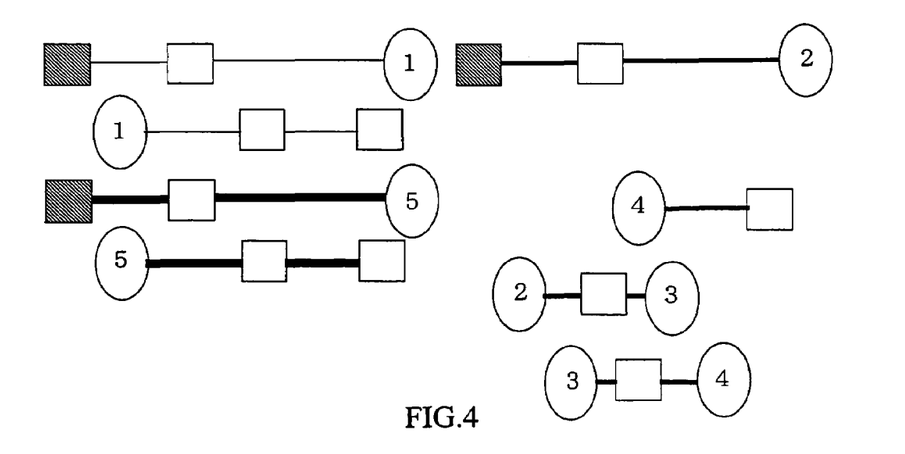
FIG. 4 is a view showing the case of performing a line break at the mark x in FIG. 3.

A line break is carried out at a point marked by x between figures from line break number 2 to line break number 3 in FIG. 3. An example of the display after the line break operation is shown in FIG. 4. Comparing FIG. 3 and FIG. 4, the right side of the circuit is shown as three lines in FIG. 3 but is shown as four lines in FIG. 4. The first line is the same on the right side of FIG. 3 and FIG. 4 but the line break numbers change from the second line onwards. In FIG. 3, the line break number used for the second line on the right side is 3 but in FIG. 4 this number is line break number 4. In FIG. 3, line break number 4 is used for the lower left circuit. But, according to the present invention, the second line on the right is given the line break number 4 as a result of applying the rule of making line break numbers consecutive for each series of figures. Looking at the third line and fourth line on the right side in FIG. 4, it can be seen that line break numbers are given in a consecutive manner so as not to break up the alignment of the figures in the circuit, i.e. line break number 3 is given to the line break location where the line break operation from FIG. 3 to FIG. 4 was carried out and line break number 4 is given to the line break location that was previously given the line break number 3. Looking at the circuit start points of the three circuits, there is no change between FIG. 3 and FIG. 4 and in this example the numbers are given to the circuit in an order from the upper left, right, and lower left. Therefore, the line break number 4 was used for the lower left circuit but as the line break number 4 is already used for the circuit on the right side in FIG. 4, the line break number for the lower left circuit, which has a lower priority, is changed to line break number 5. There is no change to the circuit on the upper left because no line break operation or moving operation is carried out from FIG. 3 to FIG. 4.

Figure 5:
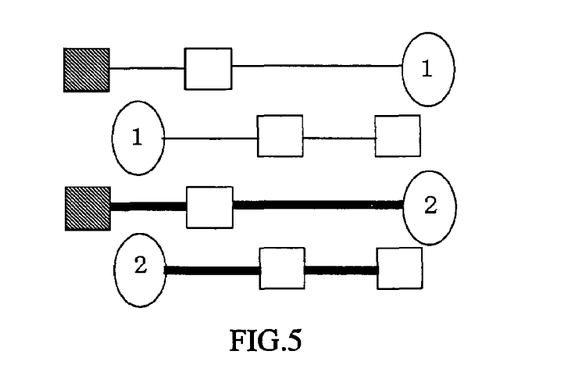
FIG. 5 is a view showing the case where the circuit on the right side of FIG. 4 is deleted.

The manner in which a line break number is changed if the circuit on the right side of FIG. 4 is deleted is shown in FIG. 5. The display contents can be changed from FIG. 4 to FIG. 5 in response to a line break operation after a deletion operation or in response to a deletion operation. If the circuit on the right side of FIG. 4 is deleted, the line break numbers 2 to 4 that were used in the right side circuit can be re-used. When line break numbers are given in the order of the upper left circuit and then the lower left circuit based on the positions of the circuit start points of the two circuits, the line break number for the lower left circuit becomes 2, as shown in FIG. 5.

Figure 6:
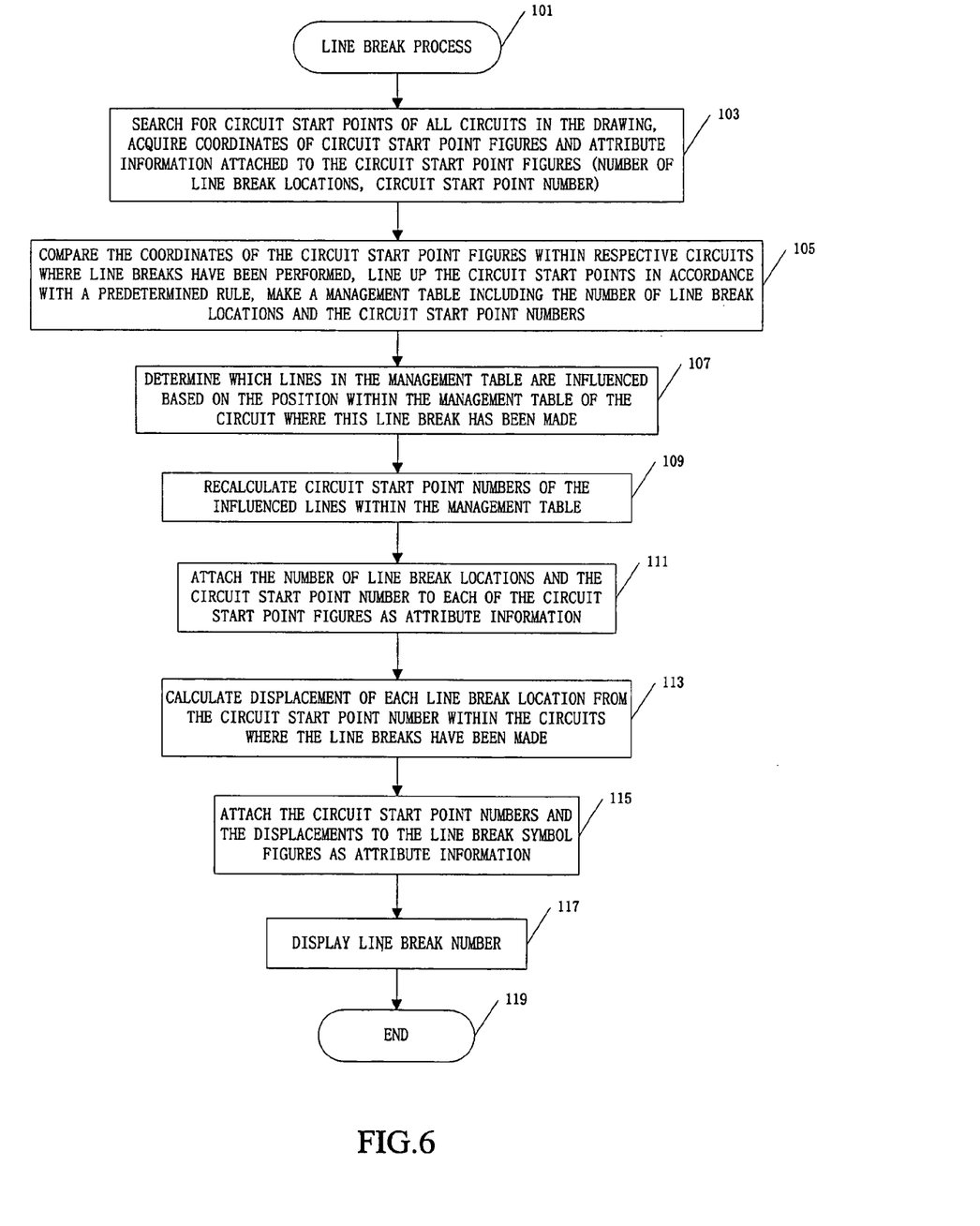
FIG. 6 is a flowchart of a process of the present invention.

A process algorithm of the present invention that makes the example display described above possible is now described using FIG. 6 to FIG. 12. Here, a process shown in FIG. 6 is carried out in response to a line break operation. As described in the above example, however, execution of the process shown in FIG. 6 in response to, for example, deletion operations or moving operations is also possible.

First, circuit start points of all of the circuits within the drawing are searched for, coordinates for the circuit start point figures and attribute information for these circuits (number of line break locations, circuit start point number) which is attached to the circuit start point figures are acquired (step 103). As described above, in this example the indication whether or not the figure is a circuit start point is stored as information in the circuit start point figure and the circuit start point is detected using this information. Position coordinates can also be acquired if the circuit start point figure can be found because position coordinates are stored for each figure. Position coordinates are, for example, central coordinates for the circuit start point figures. Only the coordinates of a circuit start point figure are acquired in step 103 if no line break has yet been made for this circuit because attribute information has not been attached. Attribute information is also acquired if a line break has already been made for this circuit because attribute information has been attached to the circuit start point figure. The circuit start point number within the attribute information is a line break number for the line break location which is the closest to the circuit start point within this circuit prior to carrying out this line break operation. It is further ensured that the circuit start point of the circuit where the line break operation, which causes this process to start, is performed can be identified.

Figure 7:
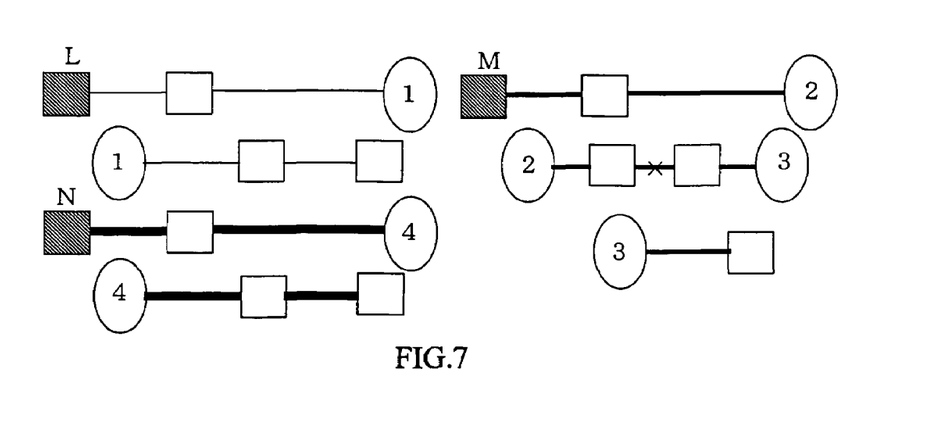
FIG. 7 is a view showing an example of a drawing with three circuits.

For example, in the case of the drawing of FIG. 7, attribute information (1, 1) is stored at a circuit start point L of the circuit on the upper left, attribute information (2, 2) is stored at a circuit start point M of the circuit on the upper right, and attribute information (1, 4) is stored at a circuit start point N of the circuit on the lower left. Priority is given between the circuits in the same manner as described above, in the order of upper left, upper right, and lower right. A line break operation is then made at the mark x of the circuit on the right side in FIG. 7, and if the process of FIG. 6 is started, the circuit start points L, M and N are detected and position coordinates for each circuit start point figure and the attribute information described above are acquired. It is ensured the circuit start point M of the circuit where this line break operation is performed can be identified.

Figure 8:
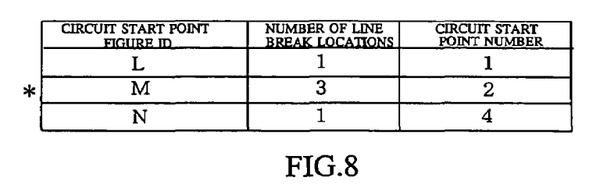
FIG. 8 is a management table made from attribute information acquired in step 103 of FIG. 6 if a line break is performed at the mark x in FIG. 7.

Next, the coordinates of circuit start point figures within the circuits where line breaks have been made are compared, the circuit start points are lined up according to a predetermined rule and a management table including the number of line break locations and circuit start point numbers is made (step 105). If the line break operation in FIG. 7 is performed, the management table is as shown in FIG. 8. In FIG. 8, the number of line break locations for the line for the circuit start point M is increased by 1 because the number of locations is increased by this line break operation. As, for example, described above, the predetermined rule is that priority is assigned based on the position of the circuit start points in the order of upper left, upper right, lower left and then lower right. In FIG. 8 the rows of the management table are lined up in the order of L, M and N. In FIG. 8, a mark * is attached to the left of the circuit start point M in FIG. 8 and this indicates that this line break has been made at the circuit including the circuit start point of this line. If a line break is performed on a circuit that has had no line breaks, no attribute information is attached to the circuit start point of this circuit. There is therefore no numeral for the column for the circuit start number for the circuit start point of this circuit.

A determination is then made as to whether there is influence from somewhere within the management table based on the position within the management table of the circuit where this line break has been made (step 107). In the present invention, there is no influence on the line up from the circuit start point of the circuit where this line break has been made in the management table and the line break number is therefore not recalculated. Lines of the management table (FIG. 8) from the mark * downwards are therefore treated as having an influence in step 107.

Figure 9:
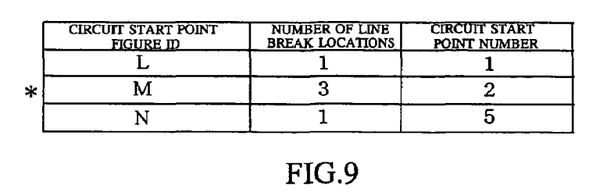
FIG. 9 shows a management table after recalculating the circuit start point numbers in the management table of FIG. 8.

The circuit start point numbers of the influenced lines within the management table are then recalculated (step 109). The circuit start point number is a number calculated by adding the two numerals (i.e. the circuit start number and the number of line break locations.) of the line one line above the recalculated line. But at the first line of the management table, the circuit start point number is fixed at 1. If step 109 is executed, FIG. 8 becomes as shown in FIG. 9. FIG. 9 differs from FIG. 8 in that the circuit start point number is 5 at the line for the circuit start point N.

Figure 10:
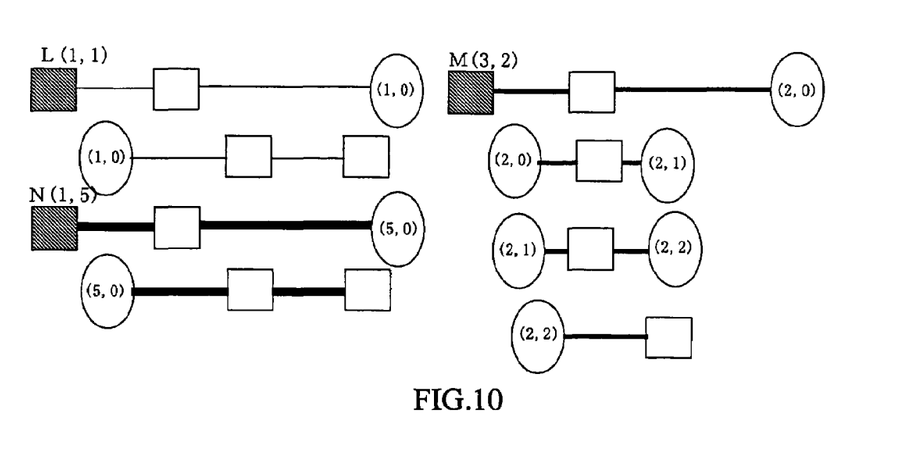
FIG. 10 shows the situation where attribute information, generated if a line break is performed at the mark x of FIG. 8, is attached to circuit start points and line break symbols, however, alphanumeric characters are not shown.

The number of line break locations and the circuit start point number are attached as attribute information to the circuit start point figures for the influenced lines (step 111). Displacement of each line break location within circuits where the line breaks have been made and which are influenced is then calculated from the circuit start point number (step 113). These displacements can be calculated by following the figures within the circuit using the figure identifiers which represent connected figures and are stored in each of the figures and by counting the line break locations in the order 0,1,2,3 . . . from the location closest to the circuit start point. At this calculation, even if part of a circuit is moved in the manner shown in FIG. 3 and FIG. 4, line break locations must be counted by following the original alignment of the figures within the circuit. Line break numbers can therefore be assigned in a manner that is easy to see without detriment to the meaning of the lining up of the figures. Circuit start point numbers and displacements can then be attached to the line break symbol figures for the influenced lines within the management table as attribute information (step 115). "Attaching" means the storing of the attribute information described above in a storage region for the circuit start point figures and the line break symbols. If a line break is made at the mark x in the drawing of FIG. 7, the drawing becomes as shown in FIG. 10, with information attached in step 111 to step 115 also being shown in FIG. 10. Here, attribute information (1, 1) (number of line break locations, circuit start point number) is attached to the circuit start point L, (1, 0) (circuit start point number, displacement) is attached to a line break symbol connected to the circuit including the circuit start point L, attribute information (3, 2) is attached to the circuit start point M, (2, 0) is attached to the first line break symbol connected to the circuit including the circuit start point M, (2, 1) is attached to a second line break symbol, (2, 2) is attached to a third line break symbol, attribute information (1, 5) is attached to the circuit start point N, and (5, 0) is attached to a line break symbol connected to the circuit including the circuit start point N. Attribute information (1, 1) for the circuit start point L is not attached in this stage as this information has not changed.

Figure 11:
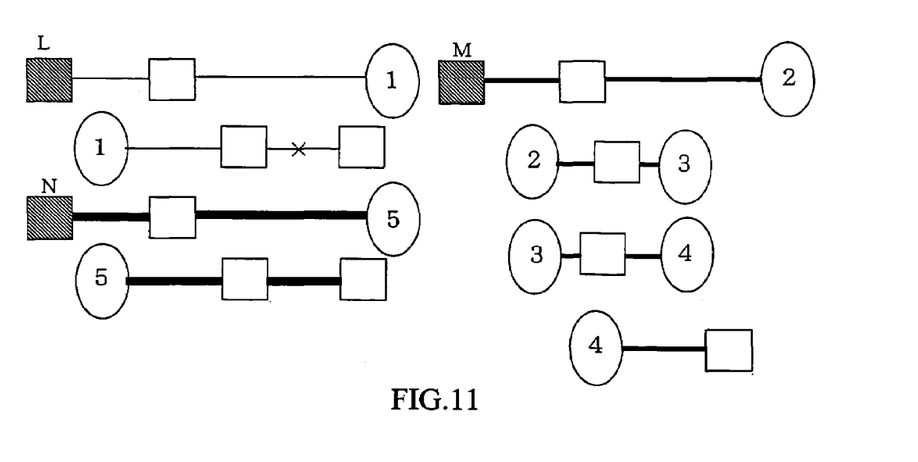
FIG. 11 is a view showing an example display after performing a line break at the mark x of FIG. 8.

Finally, two values for the attribute information attached to the line break symbols are added and displayed (step 117). Drawing as shown in FIG. 11 is displayed.

Figure 12:
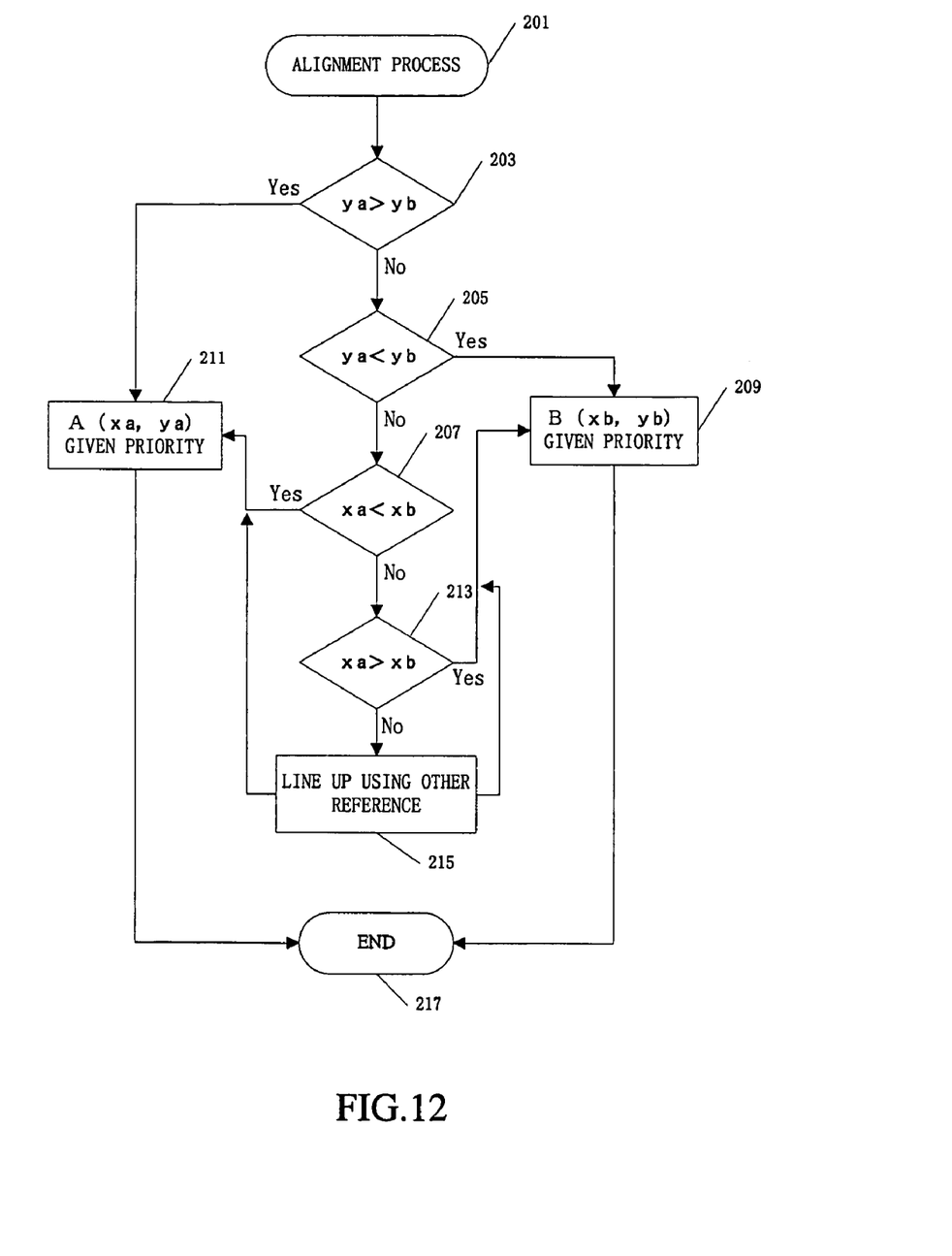
FIG. 12 is a view showing an example of an algorithm for aligning circuit start points.

Next, an example of an algorithm for sorting the circuits employed in step 105 of FIG. 6 is shown in FIG. 12. Here, two circuits A and B are present, with the circuit start point figure for circuit A being positioned at coordinates (xa, ya) and the circuit start point figure for circuit B being positioned at coordinates (xb, yb). Further, the origin is on the lower left of the drawing, and priorities are assigned to the circuit start points in order of upper left, upper right, lower left and lower right in the drawing. First, it is determined whether or not ya>yb (step 203). If ya>yb, circuit A is given priority over circuit B (step 211). If, on the other hand, ya>yb, it is determined that ya<yb (step 205). If ya<yb, the circuit B is given priority over the circuit A (step 209).

If ya<yb is not satisfied, then ya=yb, and the x coordinates are compared. It is then determined whether xa<xb (step 207). If xa<xb, circuit A is given priority over circuit B (step 211). If xa is not less than xb, it is determined that xa>xb (step 213). If xa>xb, then circuit B is given priority over circuit A (step 209). If none of the conditions in step 203, 205, 207 and 213 are fulfilled, then the circuit start points of the circuit A and the circuit B are at the same coordinates. This case is actually rare, and sorting is therefore carried out using another reference (step 215).

Line break numbers can be displayed in a manner which is easy for a user to see by sorting the line break numbers with the above described process flow, i.e. the line break numbers are displayed in such a manner that connections within the series of figures in the drawing and groups of the figures within the entire drawing can be easily identified. As recalculation of the circuit start point numbers etc. is performed only for the influenced lines within the management table, the volume of calculations is reduced and high-speed execution is enabled. Further, a management table is made only when it is necessary and only necessary data is attached to (stored at) each of the figures and data management therefore becomes simple.

Figure 13:
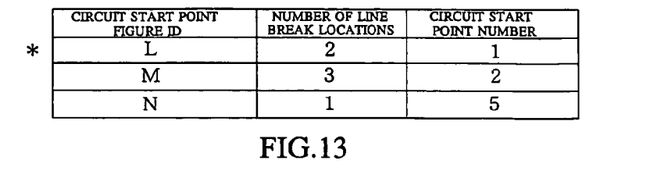
FIG. 13 is a management table made from attribute information acquired if a line break is performed at the mark x of FIG. 11.
Figure 14:
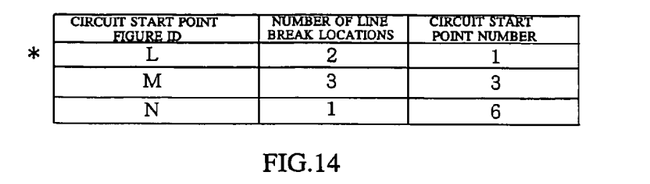
FIG. 14 shows a management table after recalculation of the circuit start point numbers of the management table of FIG. 13.

In order to make sure, a description will now be given for processing if a line break operation is further performed at the mark x in FIG. 11. If step 103 and step 105 of FIG. 6 are performed, the management table shown in FIG. 13 is made. Comparing the management table of FIG. 13 and the management table of FIG. 9, the order of the circuit start points L, M and N does not change. However, a line break operation is carried out for the circuit including the circuit start point L, the mark * is attached to the line for the circuit start point L and the numeral for the number of line break locations is changed from 1 to 2. The influenced lines within the management table are determined in step 107 but as the mark * is attached to the first line of the management table, this means that all of the circuits are influenced. If step 109 is performed and the circuit start point numbers in the management table are calculated, the management table becomes as shown in FIG. 14. The circuit start point number for the circuit start point M becomes therefore 3 and the circuit start point number for the circuit start point N becomes 6.

Figure 15:
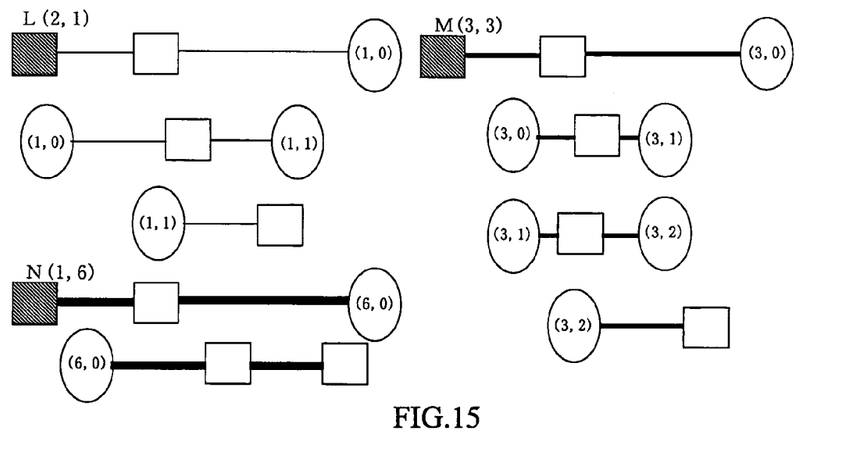
FIG. 15 shows the situation where attribute information, generated if a line break is performed at the mark x of FIG. 11, is attached to circuit start points and line break symbols, however, alphanumeric characters are not shown.
Figure 16:
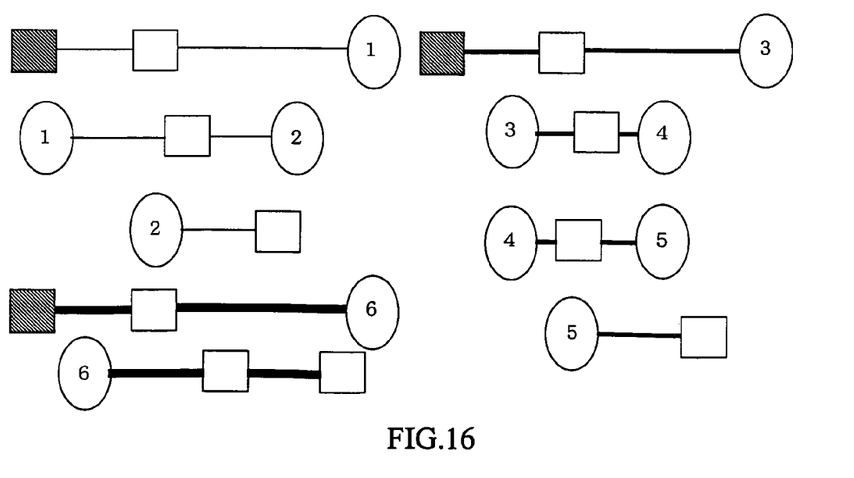
FIG. 16 is a view showing an example display after performing a line break at the mark x of FIG. 11.

If step 111 to step 115 are performed, the attribute information shown in FIG. 15 is attached, i.e. the number of line breaks and the circuit start point number (2, 1) are attached to (stored at) the circuit start point L, the circuit start point number and displacement (1, 0) are attached to the line break symbol for the first line break location of the circuit including the circuit start point L, (1, 1) is attached to the line break symbol for the second line break location, (3, 3) is attached to the circuit start point M, (3, 0) is attached to the line break symbol for the first line break location of the circuit including the circuit start point M, (3, 1) is attached to the line break symbol for the second line break location, (3, 2) is attached to the line break symbol for the third line break location, (1, 6) is attached to the circuit start point N, and (6, 0) is attached to the line break symbol for the line break location of the circuit including the circuit start point N. Sorted line break numbers can then be displayed at the line break symbols if the two numerals attached to the line break symbols are added. These line break numbers appear as in FIG. 16 when displayed.

Figure 17:
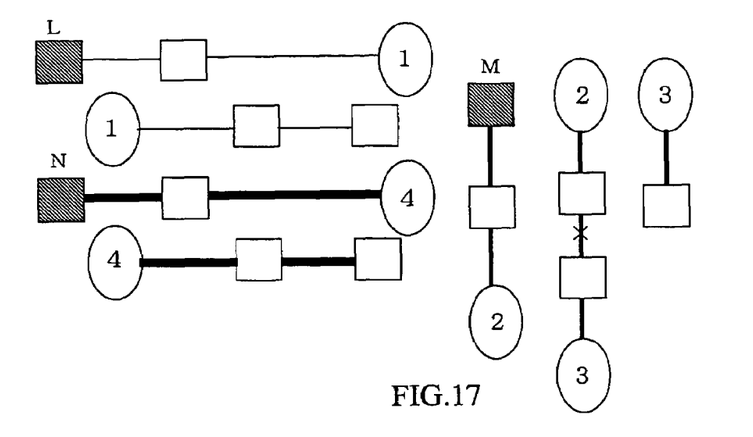
FIG. 17 is a view showing an example of a drawing where circuits in a horizontal direction and circuits in a vertical direction are mixed.

Next, processing performed if a series of figures extending in a horizontal direction and a series of figures extending in a vertical direction are mixed will be described. FIG. 17 shows an example of a drawing including circuits extending in a horizontal direction and a circuit extending in a vertical direction. The circuit on the right side of the drawing is depicted from left to right in a vertical direction. In the present invention, the same process regardless of whether the circuits are depicted in a vertical direction or horizontal direction assigns line break numbers. The order of priority of each circuit is determined based on the positions of the circuit start points and numbers are assigned in a successive manner for each circuit. In the following, a description is given for if a line break is made at the mark x of the circuit on the right side of FIG. 17.

Figure 18:
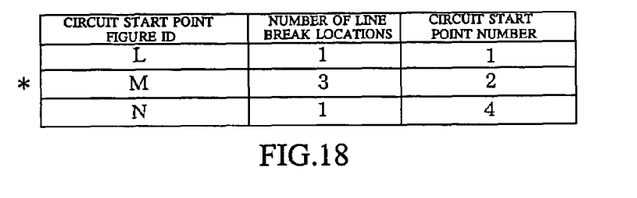
FIG. 18 is a management table made from attribute information acquired if a line break is performed at the mark x of FIG. 17.

First, step 103 and step 105 of FIG. 6 are executed. The same rule as described previously (assigning priority in the order of upper left, upper right, lower left, and lower right) is used in the lining up of the circuit start points and if the position coordinates of the circuit start points L, M and N are acquired and the coordinate values are compared, the order of the circuit start points becomes L, M, N. If the acquired attribute information is then lined up in this order, the management table shown in FIG. 18 is made. The number of line break locations is increased by one at the line for circuit start point M because a line break operation has been carried out.

Figure 19:
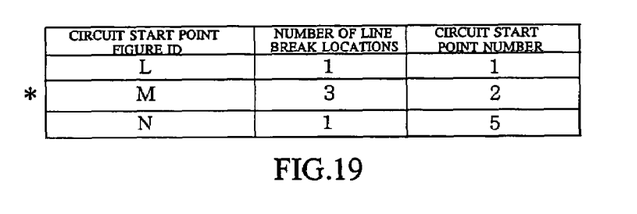
FIG. 19 shows a management table after recalculation of the circuit start point numbers of the management table of FIG. 18.
Figure 20:
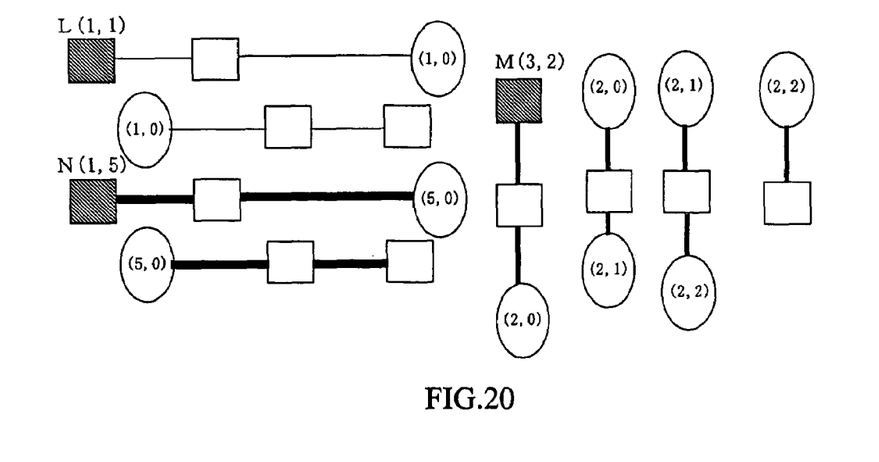
FIG. 20 shows the situation where attribute information, generated if a line break is performed at the mark x of FIG. 17, is attached to circuit start points and line break symbols, however, alphanumeric characters are not shown.
Figure 21:
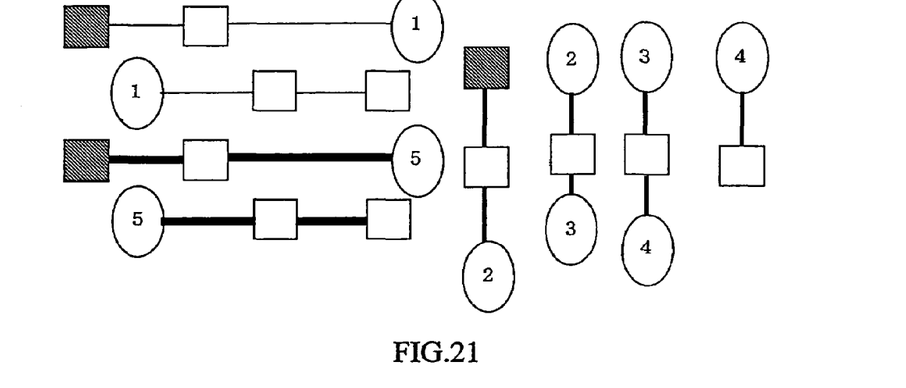
FIG. 21 is a view showing an example display after performing a line break at the mark x of FIG. 17.

The line down from the mark * in FIG. 18 is influenced by this line break operation (step 107) and the circuit start point number for the lines down from the line for the circuit start point M is therefore recalculated (step 109). The result of this recalculation is shown in FIG. 19. In FIG. 19, the circuit start point number for the line down from the mark * is changed from 4 to 5. If step 111 to step 115 are performed, the circuits become as shown in FIG. 20. These displacements can be calculated by following the figures within the circuit using the figure identifiers which represent connected figures and are stored in each of the figures and by counting the line break locations in the order 0,1,2,3 . . . from the location closest to the circuit start point. The attached attributes become as follows. The number of line break locations and circuit start point number (1, 1) are attached to the circuit start point L, and circuit start point number and displacement (1, 0) are attached to the line break symbol of the circuit including the circuit start point L, (3, 2) is attached to the circuit start point M, (2, 0) is attached to the line break symbol for the first line break location in the circuit including the circuit start point M, (2, 1) is attached to the line break symbol for the second line break location, (2, 2) is attached to the line break symbol for the third line break location, (1, 4) is attached to the circuit start point N, and (4, 0) is attached to the line break symbol for the line break location in the circuit including the circuit start point N. If this attribute information is attached, the line break numbers can be displayed as shown in FIG. 21. The attribute information (1, 1) for the circuit start point L is not, however, changed from the original and is therefore not attached in this stage.

Line break numbers can therefore be assigned taking into account the direction of a series of figures.

The above-described embodiment is simply given as an example and various modifications are possible. In the example described above, circuit start point is used as a reference figure, for example, from which the position coordinate is acquired, and to which the number of line break locations and circuit start point numbers are attached. But the reference figure is by no means limited to the circuit start point, and other figures within the circuits can also be taken as reference figures.

The process flow in FIG. 6 supposes the presence of a plurality of series of figures (for example, circuits) in the drawing but if only one series of figures is permitted, it is no longer necessary to find the circuit start point or line up the circuit start points. It is enough that line break numbers are assigned in order to the line break locations within a single series of figures. Specifically, in this situation, it is enough that step 113 onwards in FIG. 6 are performed, and the circuit start point number in step 115 may be fixed at 1.

In the above example, circuit priority is assigned to the positions of all of the circuit start points in the order of upper left, upper right, lower left, and lower right, but the present invention is by no means limited to this example, and, for example, priority can be assigned to the circuits in the order of, upper right, upper left, lower right, lower left, or upper left, lower left, upper right, lower right, etc. Priority can also be assigned using other rules.

The present invention can be applied not just to circuit diagrams and system drawings, but can also be applied to, for example, flowcharts, providing there is a series of figures comprising a plurality of figures connected together. If lines of flowcharts are interrupted and then continued at another location, connectors (which corresponds to line break symbols described above) are provided and are managed by giving the same identifiers to corresponding connectors, with consecutive numbers usually being employed. If the present invention is applied, even if flows are added to a flowchart connected using connectors, when response that connector numbers are added for this additional flow, numbers attached beforehand can be resorted and reassigned.

As described above, the present invention could provide a figure display apparatus and method and a figure display program capable of giving line break numbers to locations where line breaks have been made in order to separate a series of figures configured by connecting a number of figures into parts in a manner which makes it easy for a user to view a drawing including the series of figures, or a series of figures.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A figure displaying apparatus displaying figures, comprising:
   a sorter sorting line break numbers displayed at line break locations based on a positional relationship of said line break locations in response to a line break operation separating a series of figures, configured by connecting a plurality of figures with one line, into a plurality of parts of the separated series of figures, wherein if a plurality of said series of figures exists, in response to said line break operation on one of the plurality of said series of figures, said sorter sorts said line break numbers displayed at the line break locations based on a positional relationship of said plurality of said series of figures and the positional relationship of the line break locations occurring within said series of figures and in such a manner that said line break numbers are successive between said series of figures and within each said series of figures, regardless of positions of a plurality of parts of the one of the plurality of said series of figures with respect to positions of other of the plurality of said series of figures; and a display device displaying said plurality of parts of the separated series of figures with the sorted line break numbers assigned to said line break locations.

2. The figure displaying apparatus of claim 1, wherein the series of figures is in alignment and, if one of the plurality of parts of the separated series of figures is moved after said line break operation and said line break operation is performed again, said sorter sorts said line break numbers based on said positional relationship of said line break locations without destroying alignment of figures within said series of figures.

3. The figure displaying apparatus of claim 1, wherein said sorter:
sorts said plurality of series of figures in accordance with a predetermined rule;
determines a start number of the line break number within said series of figures including said line break location, based on the sorting result and a number of the line break locations included in said series of figures; and
determines a line break number for each said line break location based on said start number and the positional relationship of the line break locations occurring within said series of figures.

4. The figure displaying apparatus of claim 3, wherein said sorter, further, determines a start number of the line break number within said series of figures and determines a line break number for each said line break location, only for a series of figures that are influenced by said line break operation.

5. The figure displaying apparatus of claim 1, wherein said plurality of series of figures includes a series of figures extending in a horizontal direction and a series of figures extending in a vertical direction.

6. A figure displaying method of displaying figures, comprising:
in response to a line break operation separating a series of figures, configured by connecting a plurality of figures with one line, into a plurality of parts of the separated series of figures, sorting line break numbers displayed at line break locations based on a positional relationship of said line break locations, wherein
if a plurality of said series of figures exist, in response to said line break operation on one of the plurality of said series of figures, said sorting sorts said line break numbers displayed at the line break locations based on a positional relationship of said plurality of said series of figures and the positional relationship of the line break locations occurring within said series of figures in such a manner that said line break numbers are successive between said series of figures and within each said series of figures, regardless of positions of a plurality of parts of the one of the plurality of said series of figures with respect to positions of other of the plurality of said series of figures; and displaying said plurality of parts of the separated series of figures with the sorted line break numbers assigned to said line break locations.

7. The figure displaying method of claim 6, wherein the series of figures is in alignment and said sorting comprises: if one of the plurality of parts of the separated series of figures is moved after said line break operation and said line break operation is performed again, sorting said line break numbers based on said positional relationship of said line break locations without destroying the alignment of figures within said series of figures.

8. The figure displaying method of claim 6, wherein said sorting comprises:
sorting said plurality of series of figures in accordance with a predetermined rule;
determining a start number of the line break number within said series of figures including said line break location based on the sorting result and a number of the line break locations included in said series of figures; and
determining a line break number for each said line break location based on said start number and the positional relationship of the line break locations occurring within said series of figures.

9. The figure displaying method of claim 8, wherein said determining a start number of the line break number within said series of figures and determining a line break number for each said line break location are performed only for a series of figures that are influenced by said line break operation.

10. The figure displaying method of claim 6, wherein said plurality of series of figures includes a series of figures extending in a horizontal direction and a series of figures extending in a vertical direction.

11. A computer readable storage medium for storing a figure displaying program for displaying figures, said figure displaying program causing a computer to execute the functions of:
in response to a line break operation for separating a series of figures, configured by connecting a plurality of figures with one line, into a plurality of sub parts of the separated series of figures, sorting line break numbers displayed at line break locations based on a positional relationship of said line break locations, wherein
if a plurality of said series of figures exists, in response to said line break operation on one of the plurality of said series of figures, said sorting sorts said line break numbers displayed at the line break locations based on a positional relationship of said plurality of said series of figures and the positional relationship of the line break locations occurring within said series of figures in such a manner that said line break numbers are successive between said series of figures and within each said series of figures regardless of positions of a plurality of parts of the one of the plurality of said series of figures with respect to positions of other of the plurality of said series of figures; and displaying said plurality of parts of the separated series of figures with the sorted line break numbers assigned to said line break locations.

12. A computer readable storage medium of claim 11, wherein the series of figures is in alignment and said sorting comprises: if one of the plurality of parts of the separated series of figures is moved after said line break operation and said line break operation is performed again, sorting said line break numbers based on said positional relationship of said line break locations without destroying the alignment of figures within said series of figures.

13. A computer readable storage medium of claim 11, wherein said sorting function comprises:
   sorting said plurality of series of figures in accordance with a predetermined rule;
   determining a start number of the line break number within said series of figures including said line break location based on the sorting result and a number of the line break locations included in said series of figures; and
   determining a line break number for each said line break location based on said start number and the positional relationship of the line break locations occurring within said series of figures.

14. A computer readable storage medium of claim 13, wherein said functions of determining a start number of the line break number within said series of figures and determining a line break number for each said line break location are preformed only for a series of figures that are influenced by said line break operation.

15. A computer readable storage medium of claim 11, wherein said plurality of series of figures includes a series of figures extending in a horizontal direction and a series of figures extending in a vertical direction.

16. A method of displaying figures, comprising:
   generating and sorting line break numbers displayed at line break locations based on a positional relationship of said line break locations numbers in response to a line break operation separating a series of figures, configured by connecting a plurality of figures with one line, into a plurality of parts of the separated series of figures, wherein
   if a plurality of said series of figures exists, in response to said line break operation on one of the plurality of said series of figures, said sorting sorts said line break numbers displayed at the line break locations based on a positional relationship of said plurality of said series of figures and the positional relationship of the line break locations occurring within said series of figures and in such a manner that said line break numbers are successive between said series of figures and within each said series of figures, regardless of positions of a plurality of parts of the one of the plurality of said series of figures with respect to positions of other of the plurality of said series of figures; and
   displaying said plurality of parts of the separated series of figures and said line break numbers.

* * * * *

UNITED STATES PATENT AND TRADEMARK OFFICE
CERTIFICATE OF CORRECTION

PATENT NO. : 7,227,558 B1 Page 1 of 1
APPLICATION NO. : 09/499730
DATED : June 5, 2007
INVENTOR(S) : Kazunori Arata

It is certified that error appears in the above-identified patent and that said Letters Patent is hereby corrected as shown below:

Title Page (56), Column 2 (Other Publications), Line 1, change "Jun. 25," to --Jan. 25,--

Column 12, Line 41, before "parts" delete "sub".

Signed and Sealed this

Twentieth Day of November, 2007

JON W. DUDAS
*Director of the United States Patent and Trademark Office*